(12) United States Patent
Jung et al.

(10) Patent No.: US 11,828,917 B2
(45) Date of Patent: Nov. 28, 2023

(54) IMAGING LENS SYSTEM INCLUDING EIGHT LENSES OF +--++-+-, +--+--+- OR +---+-+- REFRACTIVE POWERS

(71) Applicant: Samsung Electro-Mechanics Co., Ltd., Suwon-si (KR)

(72) Inventors: Phil Ho Jung, Suwon-si (KR); Yong Joo Jo, Suwon-si (KR); Hyo Jin Hwang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 296 days.

(21) Appl. No.: 17/016,492

(22) Filed: Sep. 10, 2020

(65) Prior Publication Data

US 2021/0157104 A1 May 27, 2021

(30) Foreign Application Priority Data

Nov. 25, 2019 (KR) .................. 10-2019-0152526

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 2007/0053071 A1 | 3/2007 | Kim et al. |
| 2009/0040622 A1 | 2/2009 | Iwama |
| 2011/0075268 A1 | 3/2011 | Ishibashi |
| 2016/0085050 A1 | 3/2016 | Kunugise et al. |
| 2017/0045714 A1 | 2/2017 | Huang |
| 2017/0052350 A1 | 2/2017 | Chen |
| 2017/0254990 A1 | 9/2017 | Noda et al. |

(Continued)

FOREIGN PATENT DOCUMENTS

| CN | 107703609 A | 2/2018 |
| CN | 207424361 U | 5/2018 |

(Continued)

OTHER PUBLICATIONS

Taiwanese Office Action dated May 25, 2021 issued in counterpart Taiwanese Patent Application No. 109131767. (12 pages in English)(11 pages in Taiwanese).

(Continued)

*Primary Examiner* — Wen Huang
(74) *Attorney, Agent, or Firm* — NSIP Law

(57) ABSTRACT

An imaging lens system includes a first lens, a second lens having negative refractive power, a third lens, a fourth lens, a fifth lens, a sixth lens, a seventh lens, and an eighth lens having a concave object-side surface in a paraxial region, disposed in order from an object side in a direction of an imaging plane. The imaging lens system satisfies TTL/2IMGHT<1.5, where TTL is a distance from an object-side surface of the first lens to the imaging plane and IMGHT is one-half of a diagonal length of the imaging plane.

19 Claims, 10 Drawing Sheets

(56) References Cited

U.S. PATENT DOCUMENTS

| | | |
|---|---|---|
| 2017/0329108 A1 | 11/2017 | Hashimoto |
| 2018/0074299 A1 | 3/2018 | Huang |
| 2018/0180856 A1 | 6/2018 | Jung et al. |
| 2018/0239117 A1 | 8/2018 | Lee et al. |
| 2018/0348491 A1 | 12/2018 | Lee |
| 2019/0056568 A1 | 2/2019 | Huang |
| 2019/0204556 A1 | 7/2019 | Jhang et al. |
| 2019/0204559 A1 | 7/2019 | Jhang et al. |
| 2020/0174227 A1 | 6/2020 | Nitta |
| 2020/0201002 A1 | 6/2020 | Xu et al. |
| 2020/0393648 A1* | 12/2020 | Lin .................... G02B 9/64 |
| 2021/0063697 A1* | 3/2021 | Li ..................... G02B 9/64 |
| 2021/0109323 A1* | 4/2021 | Dai ............... G02B 13/0045 |
| 2021/0149158 A1* | 5/2021 | Hsueh ................. G02B 9/64 |
| 2021/0157103 A1 | 5/2021 | Son et al. |
| 2021/0173183 A1 | 6/2021 | Ye et al. |

FOREIGN PATENT DOCUMENTS

| | | |
|---|---|---|
| CN | 108761730 A | 11/2018 |
| CN | 110412749 A | 11/2019 |
| JP | 2008-292907 A | 12/2008 |
| JP | 2016-65906 A | 4/2016 |
| JP | 2017-116594 A | 6/2017 |
| JP | 2017-161569 A | 9/2017 |
| JP | 2019-197088 A | 11/2019 |
| JP | 2019-204113 A | 11/2019 |
| KR | 10-1671451 B1 | 11/2016 |
| KR | 10-2021-0062432 A | 5/2021 |
| TW | 201930945 A | 8/2019 |
| WO | WO 2019/100768 A1 | 5/2019 |

OTHER PUBLICATIONS

Korean Office Action dated Dec. 15, 2021, in counterpart Korean Patent Application No. 10-2019-0152526 (9 pages in English and 6 pages in Korean).

Taiwanese Office Action dated Aug. 29, 2022, in counterpart Taiwanese Patent Application No. 111103465 (7 pages in English and 6 pages in Chinese).

Chinese Office Action dated Nov. 19, 2021, in counterpart Chinese Patent Application No. 202011259105.0 (10 pages in English and 13 pages in Chinese).

Indian Office Action dated Aug. 9, 2021 issued in counterpart Indian Patent Application No. 202014042129.

Korean Office Action dated Dec. 24, 2020 in counterpart Korean Patent Application No. 10-2019-0152526 (7 pages in English)(5 pages in Korean).

Korean Office Action dated Feb. 18, 2023, in counterpart Korean Patent Application No. 10-2022-0078860 (7 pages in English, 6 pages in Korean).

* cited by examiner

IMAGING LENS SYSTEM INCLUDING EIGHT LENSES OF +--++-+-, +--+--+- OR +---+-+- REFRACTIVE POWERS

CROSS-REFERENCE TO RELATED APPLICATION(S)

This application claims the benefit under 35 USC 119(a) of Korean Patent Application No. 10-2019-0152526 filed on Nov. 25, 2019 in the Korean Intellectual Property Office, the entire disclosure of which is incorporated herein by reference for all purposes.

BACKGROUND

1. Field

The following description relates to an imaging lens system including eight lenses.

2. Description of Related Art

A small-sized camera may be mounted on a wireless terminal device. For example, a small-sized camera may be mounted on each of a front surface and a rear surface of a wireless terminal device. As such a small-sized camera may be used for various purposes, to obtain images of scenery, indoor portraits, and the like, such a small-sized camera has been required to have performance similar to that of a general camera. However, it may be difficult for a small-sized camera to implement high performance as there may be a limitation in mounting space due to a limited size of a wireless terminal device. Thus, it has been required to develop an imaging lens system which may improve performance of a small-sized camera without increasing a size of a small-sized camera.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An imaging lens system which may improve performance of a small-sized camera.

In one general aspect, an imaging lens system includes a first lens, a second lens having negative refractive power, a third lens, a fourth lens, a fifth lens, a sixth lens, a seventh lens, and an eighth lens having a concave object-side surface in a paraxial region, disposed in order from an object side in a direction of an imaging plane. The imaging lens system satisfies TTL/2IMGHT<1.5, where TTL is a distance from an object-side surface of the first lens to the imaging plane and IMGHT is one-half of a diagonal length of the imaging plane.

The second lens may have a concave image-side surface.
The fourth lens may have positive refractive power.
The fifth lens may have a concave image-side surface.
The sixth lens may have negative refractive power.
The seventh lens may have positive refractive power.
The imaging lens system may satisfy $0.5<f1/f<1.0$, where f is a focal length of the imaging lens system, and f1 is a focal length of the first lens.
The second lens may have an Abbe number of lower than 40.

The imaging lens system may satisfy $0.05<TTL/FOV<0.2$, where FOV is a field of view of the imaging lens system.

The imaging lens system may satisfy $0.2<T8/T7<0.9$, where T7 is a thickness of the seventh lens at a center of an optical axis, and T8 is a thickness of the eighth lens at a center of an optical axis.

In another general aspect, an imaging lens system includes a first lens, a second lens having negative refractive power, a third lens, a fourth lens, a fifth lens, a sixth lens having a concave image-side surface, a seventh lens, and an eighth lens having a concave object-side surface, disposed in order from an object side in a direction of an imaging plane.

An f number of the imaging lens system may be 1.7 or lower.

The imaging lens system may satisfy $-4.0<f2/f1<-2.0$, where f1 is a focal length of the first lens, and f2 is a focal length of the second lens.

The imaging lens system may satisfy $0.2<f3/f2<0.5$, where f2 is a focal length of the second lens, and f3 is a focal length of the third lens.

The imaging lens system may satisfy $-5.0<f6/f7<-2.0$, where f6 is a focal length of the sixth lens, and f7 is a focal length of the seventh lens.

The imaging lens system may satisfy $-3.0<f7/f8<-1.0$, where f7 is a focal length of the seventh lens, and f8 is a focal length of the eighth lens.

In another general aspect, an imaging lens system includes a first lens having positive refractive power, a second lens having negative refractive power, a third lens having negative refractive power, a fourth lens having refractive power, a fifth lens having refractive power, a sixth lens having positive refractive power, a seventh lens having positive refractive power, and an eighth lens having negative refractive power, disposed in order from an object side in a direction of an imaging plane. The imaging lens system satisfies TTL/2IMGHT<1.5, where TTL is a distance from an object-side surface of the first lens to the imaging plane and IMGHT is one-half of a diagonal length of the imaging plane.

The first through seventh lenses may be meniscus lenses and the eighth lens may be a bi-concave lens.

The first lens may be thicker along an optical axis that each of the other lenses.

The second lens may be thinner along an optical axis that each of the other lenses.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
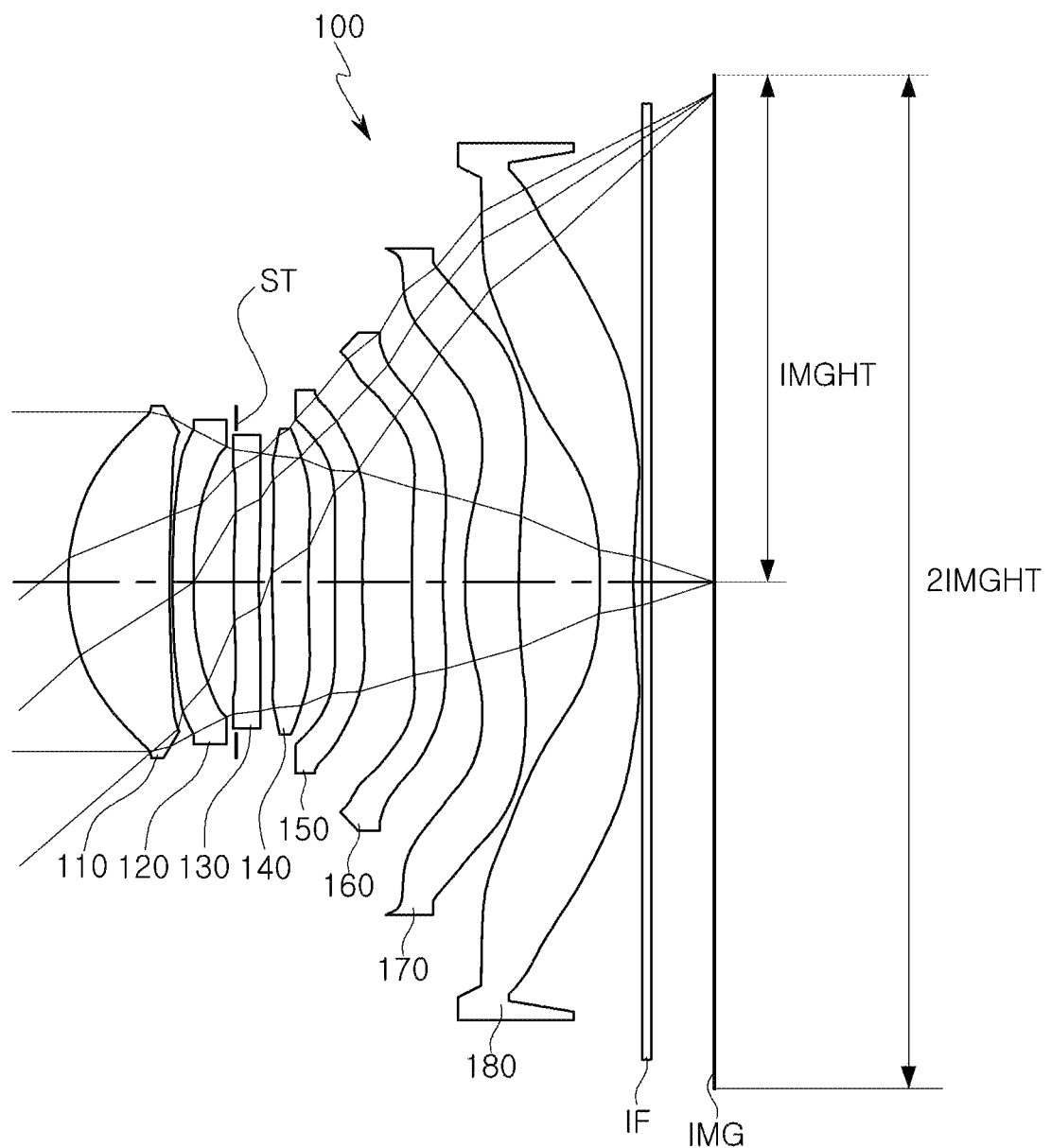
FIG. 1 is a diagram illustrating a first example of an imaging lens system.
Figure 2:
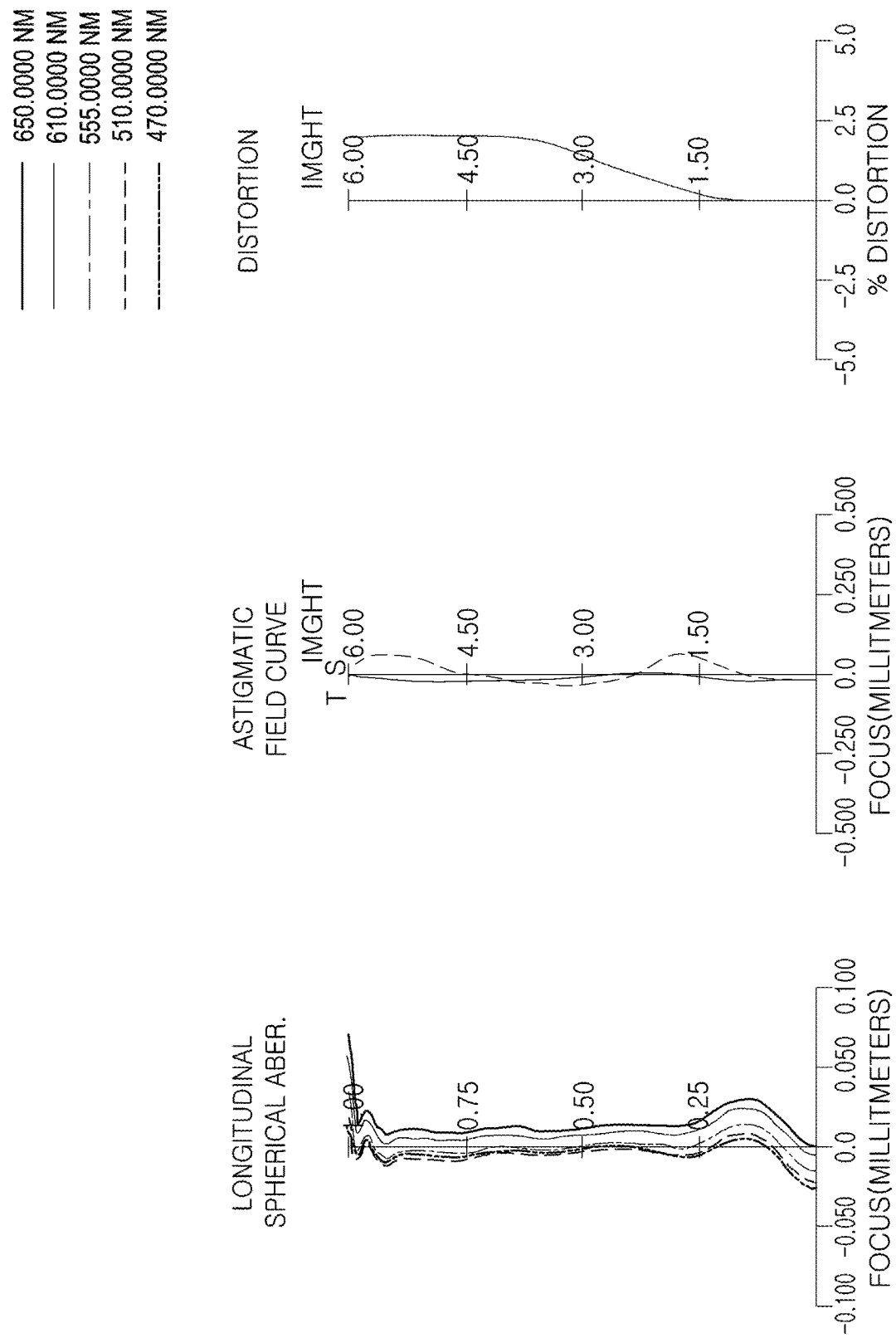
FIG. 2 is aberration curves of the imaging lens system illustrated in FIG. 1.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

In the examples, a first lens refers to a lens most adjacent to an object (or a subject), and an eighth lens refers to a lens most adjacent to an imaging plane (or an image sensor). In the examples, a unit of a radius of curvature, a thickness, a TTL (a distance from an object-side surface of the first lens to an imaging plane), an 2IMGHT (a diagonal length of an imaging plane), and a focal length are indicated in millimeters (mm).

A thickness of a lens, a gap between lenses, and a TTL refer to a distance of a lens in an optical axis. Also, in the descriptions of a shape of a lens, the configuration in which one surface is convex indicates that an optical axis region of the surface is convex, and the configuration in which one surface is concave indicates that an optical axis region of the surface is concave. Thus, even when it is described that one surface of a lens is convex, an edge of the lens may be concave. Similarly, even when it is described that one surface of a lens is concave, an edge of the lens may be convex.

The imaging lens system may include eight lenses. For example, the imaging lens system may include a first lens, a second lens, a third lens, a fourth lens, a fifth lens, a sixth lens, a seventh lens, and an eighth lens, disposed in order from an object side. The first to eighth lenses may be disposed with a predetermined gap therebetween. For example, image-side surfaces and object-side surfaces of adjacent lenses are not in contact with each other in a paraxial region. Accordingly, even when an image-side surface of one side lens is in contact with an object-side surface of the other side lens in the diagrams, the image-side surface and the object-side surface of the two lenses are not actually in contact with each other.

The first lens may have refractive power. One surface of the first lens may be convex. For example, the first lens may have a convex object-side surface. The first lens may include an aspherical surface. For example, both surfaces of the first lens may be aspherical. The first lens may be formed of a material having high light transmissivity and excellent workability. For example, the first lens may be manufactured using a plastic material. The first lens may have a predetermined refractive index. For example, a refractive index of the first lens may be lower than 1.6. The first lens may have a predetermined Abbe number. For example, an Abbe number of the first lens may be 50 or greater. The first lens may have a predetermined focal length. For example, a focal length of the first lens may be 4.0 to 6.8 mm.

The second lens may have refractive power. For example, the second lens may have negative refractive power. One surface of the second lens may be concave. For example, the second lens may have a concave image-side surface. The second lens may include an aspherical surface. For example, both surfaces of the second lens may be aspherical. The second lens may be formed of a material having high light transmissivity and excellent workability. For example, the second lens may be manufactured using a plastic material. The second lens may have a predetermined refractive index. For example, a refractive index of the second lens may 1.6 or greater. The second lens may have a predetermined Abbe number. For example, an Abbe number of the second lens may be lower than 23. The second lens may have a predetermined focal length. For example, a focal length of the second lens may be −20 to −10 mm.

The third lens may have refractive power. One surface of the third lens may be convex. For example, the third lens may have a convex object-side surface. The third lens may include an aspherical surface. For example, both surfaces of the third lens may be aspherical. The third lens may be formed of a material having high light transmissivity and excellent workability. For example, the third lens may be manufactured using a plastic material. The third lens may have a refractive index greater than that of the first lens. For example, a refractive index of the third lens may be 1.6 or greater. The third lens may have a predetermined Abbe number. For example, an Abbe number of the third lens may be lower than 23. The third lens may have a predetermined focal length. For example, a focal length of the third lens may be −65 to −30 mm.

The fourth lens may have refractive power. One surface of the fourth lens may be convex. For example, the fourth lens may have a convex object-side surface. The fourth lens may include an aspherical surface. For example, both surfaces of the fourth lens may be aspherical. The fourth lens may be formed of a material having high light transmissivity and excellent workability. For example, the fourth lens may be manufactured using a plastic material. The fourth lens may have a refractive index lower than that of the third lens. For example, a refractive index of the fourth lens may be lower than 1.6. The fourth lens may have a predetermined Abbe number. For example, an Abbe number of the fourth lens may be greater than an Abbe number of the third lens. The fourth lens may have a predetermined focal length. For example, a focal length of the fourth lens may be lower than −100 mm or 30 mm or greater.

The fifth lens may have refractive power. One surface of the fifth lens may be concave. For example, the fifth lens may have a concave image-side surface. The fifth lens may have a shape having an inflection point. For example, at least one of an object-side surface and an image-side surface of the sixth lens may have an inflection point. The fifth lens may include an aspherical surface. For example, both surfaces of the fifth lens may be aspherical. The fifth lens may be formed of a material having high light transmissivity and excellent workability. For example, the fifth lens may be manufactured using a plastic material. The fifth lens may have a predetermined refractive index. For example, the fifth lens may have a refractive index lower than that of the third lens. The fifth lens may have a predetermined Abbe number. For example, an Abbe number of the fifth lens may be greater than an Abbe number of the third lens. The fifth lens may have a predetermined focal length. For example, a focal length of the fifth lens may be −50 mm or less or 30 mm.

The sixth lens may have refractive power. One surface of the sixth lens may be convex. For example, the sixth lens may have a convex object-side surface. The sixth lens may have a shape having an inflection point. For example, at least one of an object-side surface and an image-side surface of the sixth lens may have an inflection point. The sixth lens may include an aspherical surface. For example, both surfaces of the sixth lens may be aspherical. The sixth lens may be formed of a material having high light transmissivity and excellent workability. For example, the sixth lens may be manufactured using a plastic material. The sixth lens may have a predetermined refractive index. For example, a refractive index of the sixth lens may be greater than a refractive index of the fifth lens. The sixth lens may have a predetermined Abbe number. For example, an Abbe number of the sixth lens may be 25 or greater and lower than 40. The sixth lens may have a predetermined focal length. For example, a focal length of the sixth lens may be −38 to −10 mm.

The seventh lens may have refractive power. One surface of the seventh lens may be convex. For example, the seventh lens may have a convex object-side surface. The seventh lens may have a shape having an inflection point. For example, at least one of an object-side surface and an image-side surface of the seventh lens may have an inflection point. The seventh lens may include an aspherical surface. For example, both surfaces of the seventh lens may be aspherical. The seventh lens may be formed of a material having high light transmissivity and excellent workability. For example, the seventh lens may be manufactured using a plastic material. The seventh lens may have a predetermined refractive index. For example, a refractive index of the seventh lens may be lower than a refractive index of the sixth lens. The seventh lens may have an Abbe number greater than that of the sixth lens. For example, an Abbe number of the seventh lens may be 50 or greater. The seventh lens may have a predetermined focal length. For example, a focal length of the seventh lens may be 3.6 to 7.4 mm.

The eighth lens may have refractive power. At least one surface of the eighth lens may be concave. For example, the eighth lens may have a concave image-side surface in a paraxial region. The eighth lens may have a shape having an inflection point. For example, at least one of an object-side surface and an image-side surface of the eighth lens may have an inflection point. The eighth lens may include an aspherical surface. For example, both surfaces of the eighth lens may be aspherical. The eighth lens may be formed of a material having high light transmissivity and excellent workability. For example, the eighth lens may be manufactured using a plastic material. The eighth lens may have a predetermined refractive index. For example, a refractive index of the eighth lens may be lower than a refractive index of the sixth lens. The eighth lens may have an Abbe number greater than that of the sixth lens. For example, an Abbe number of the eighth lens may be 50 or greater. The eighth lens may have a predetermined focal length. For example, a focal length of the eighth lens may be −6.2 to −3.1 mm.

In the imaging lens system, the first lens may be the thickest lens. For example, a thickness of the first lens at a center of an optical axis may be greater than a thickness of the other lenses (second to eighth lenses) at a center of an optical axis.

In the imaging lens system, the second lens may be the thinnest lens. For example, a thickness of the second lens at a center of an optical axis may be smaller than a thickness of the other lenses (first lens, and third lens to eighth lens) at a center of an optical axis.

Each of the first to eighth lenses may include an aspherical surface. An aspherical surface of each of the first to eighth lenses may be represented by Equation 1 as below:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$ [Equation 1]

In equation 1, "c" is an inverse of a radius of a curvature of a respective lens, "k" is a conic constant, "r" is a distance from a certain point on an aspherical surface of the lens to an optical axis, "A to J" are aspheric constants, "Z" (or SAG) is a height from a certain point on an aspherical surface to an apex of the aspherical surface in an optical axis direction.

The imaging lens system may further include a filter, an image sensor, and a stop. The filter may be disposed between the eighth lens and an image sensor. The filter may be configured to block light of a certain wavelength. For example, a filter may block light of infrared wavelengths. The image sensor may form an imaging plane. For example, a surface of the image sensor may form an imaging plane. The stop may be arranged to adjust the amount of light incident to the lens. For example, the stop may be disposed between the second and third lenses.

The imaging lens system may have a predetermined focal length. For example, the focal length f of the imaging lens system may be 5.6-7.0 mm. The imaging lens system may have an imaging plane of a considerable size to realize high resolution. For example, a diagonal length (2IMGHT) of the imaging plane of the imaging lens system may be 10-14 mm.

The imaging lens system may satisfy one or more of conditional expressions below:

$TTL/\mathrm{IMGHT}<1.5$ $0.05<TTL/\mathrm{FOV}<0.2$ $0.2<T8/T7<0.9$ $f\,\mathrm{number}\leq1.7$ $78\leq\mathrm{FOV}\leq85$ $0.5<f1/f<1.0$ $-4.0<f2/f1<-2.0$ $0.2<f3/f2<0.5$ $-5.0<f6/f7<-2.0$ $-3.0<f7/f8<-1.0$ In the conditional expressions, TTL is a distance from an object-side surface of the first lens to an imaging plane, IMGHT is ½ of a diagonal length of the imaging plane, T7 is a thickness of the seventh lens at a center of an optical axis, T8 is a thickness of the eighth lens at a center of an optical axis, FOV is a field of view of the imaging lens system, f is a focal length of the imaging lens system, f1 is a focal length of the first lens, f2 is a focal length of the second lens, f3 is a focal length of the third lens, f6 is a focal length of the sixth lens, f7 is a focal length of the seventh lens, and f8 is a focal length of the eighth lens.

The imaging lens system may further satisfy one or more of conditional expressions below:

$0.4<f1/f7<1.2$ $-1.4<f1/f8<-0.4$ $18<(V2+V3)/2<22$ $V2<40$ $V3<V6<V7$ $T5<T4$ $2.0<(R11+R12)/(R11-R12)<5.0$ $0.72<DL1L4/DL5L8<0.82$ $1.06<f/\mathrm{IMGHT}<1.12$ In the above conditional expressions, V2 is an Abbe number of the second lens, V3 is an Abbe number of the third lens, V6 is an Abbe number of the sixth lens, V7 is an Abbe number of the seventh lens, T4 is a thickness of the fourth lens at a center of an optical axis, T5 is a thickness of the fifth lens at a center of an optical axis, R11 is a radius of curvature of an object-side surface of the sixth lens, R12 is a radius of curvature of an image-side surface of the sixth lens, DL1 L4 is a distance from an object-side surface of the first lens to an image-side surface of the fourth lens, and DL5L8 is a distance from an object-side surface of the fifth lens to an image-side surface of the eighth lens.

The imaging lens system may further satisfy one or more of conditional expressions below:

$f\,\mathrm{number}\leq1.64$ $0.4<|f3/f5|<1.6$ $2.0<(R5+R6)/(R5-R6)<4.0$ $-2.0<(R13+R14)/(R13-R14)<-0.8$ $1.0<f/f1<1.3$ In the above conditional expressions, R5 is a radius of curvature of an object-side surface of the third lens, R6 is a radius of curvature of an image-side surface of the third lens, R13 is a radius of curvature of an object-side surface of the seventh lens, and R14 is a radius of curvature of an image-side surface of the seventh lens.

In the description below, various examples of an imaging lens system will be described.

A first example of the imaging lens system will be described with reference to FIG. 1.

The imaging lens system 100 may include a first lens 110, a second lens 120, a third lens 130, a fourth lens 140, a fifth lens 150, a sixth lens 160, a seventh lens 170 and an eighth lens 180.

The first lens 110 may have positive refractive power, and may have a convex object-side surface and a concave image-side surface. The second lens 120 may have negative refractive power, and may have a convex object-side surface and a concave image-side surface. The third lens 130 may have negative refractive power, and may have a convex object-side surface and a concave image-side surface. The fourth lens 140 may have positive refractive power, and may have a convex object-side surface and a concave image-side surface. The fifth lens 150 may have positive refractive power, and may have a convex object-side surface and a concave image-side surface. An inflection point may be formed on at least one of an object-side surface and an image-side surface of the fifth lens 150. The sixth lens 160 may have negative refractive power, and may have a convex object-side surface and a concave image-side surface. An inflection point may be formed on at least one of an object-side surface and an image-side surface of the sixth lens 160. The seventh lens 170 may have positive refractive power, and may have a convex object-side surface and a concave image-side surface. An inflection point may be formed on at least one of an object-side surface and an image-side surface of the seventh lens 170. The eighth lens 180 may have negative refractive power, and a concave object-side surface and a concave image-side surface. An inflection point may be formed on at least one of an object-side surface and an image-side surface of the eighth lens 180.

The imaging lens system 100 may further include a filter IF, an image sensor IMG, and a stop ST. The filter IF may be disposed between the eighth lens 180 and the image sensor IMG. The image sensor IMG may provide a surface on which the light refracted by the first lens 110 to the eighth lens 180 is formed. One surface of the image sensor IMG may be substantially the same as a size of an imaging plane. For example, a diagonal length (IMGHT) of an imaging plane refers to a diagonal length of the image sensor IMG, and a height (IMGHT) of the imaging plane may refer to a distance from a center of an optical axis of the image sensor IMG to an edge. The stop ST may be disposed between the second lens 120 and the third lens 130.

Tables 1 and 2 list lens characteristics and aspherical values of the imaging lens system 100.

TABLE 1

| Surface No. | Note | Radius of Curvature | Thickness/ Distance | Refractive Index | Abbe Number |
|---|---|---|---|---|---|
| S1 | First Lens | 2.614 | 1.229 | 1.544 | 56.1 |
| S2 | | 13.250 | 0.030 | | |
| S3 | Second Lens | 8.382 | 0.260 | 1.671 | 19.2 |
| S4 | | 4.600 | 0.513 | | |
| S5 | Third Lens | 36.246 | 0.294 | 1.671 | 19.2 |
| S6 | | 18.692 | 0.179 | | |
| S7 | Fourth Lens | 21.884 | 0.421 | 1.544 | 56.1 |
| S8 | | 44.944 | 0.311 | | |
| S9 | Fifth Lens | 11.403 | 0.345 | 1.544 | 56.1 |
| S10 | | 15.697 | 0.587 | | |
| S11 | Sixth Lens | 8.331 | 0.374 | 1.568 | 37.4 |
| S12 | | 3.991 | 0.257 | | |
| S13 | Seventh Lens | 2.768 | 0.688 | 1.544 | 56.1 |
| S14 | | 46.960 | 0.974 | | |
| S15 | Eighth Lens | −5.807 | 0.400 | 1.544 | 56.1 |
| S16 | | 4.658 | 0.108 | | |
| S17 | Filter | Infinity | 0.110 | 1.517 | 64.2 |
| S18 | | Infinity | 0.745 | | |
| S19 | Imaging Plane | Infinity | | | |

TABLE 2

| Surface No. | K | A | B | C | D | E | F |
|---|---|---|---|---|---|---|---|
| S1 | −1.020906 | −0.02031 | 0.1081 | −0.2463 | 0.3636 | −0.3645 | 0.2558 |
| S2 | −1.020906 | −0.02031 | 0.1081 | −0.2463 | 0.3636 | −0.3645 | 0.2558 |
| S3 | 16.556932 | −0.02713 | 0.02796 | −0.01927 | −0.02871 | 0.1407 | −0.2581 |
| S4 | 2.4401366 | −0.005124 | −0.03145 | 0.2723 | −1.1 | 2.735 | −4.521 |
| S5 | 0 | 0.01589 | −0.2478 | 1.109 | −3.201 | 6.302 | −8.759 |
| S6 | 91.031791 | −0.03822 | 0.1395 | −0.5562 | 1.396 | −2.349 | 2.755 |
| S7 | 98.73369 | −0.02421 | 0.09052 | −0.42 | 1.214 | −2.342 | 3.122 |
| S8 | 66.244315 | −0.04555 | 0.1596 | -0.5245 | 1.098 | −1.548 | 1.526 |
| S9 | 0 | −0.03292 | 0.01251 | −0.1042 | 0.3161 | −0.5799 | 0.714 |
| S10 | 0 | -0.03512 | 0.04726 | −0.1521 | 0.2738 | −0.323 | 0.2649 |
| S11 | 0 | −0.05627 | 0.04252 | −0.03306 | 0.02226 | −0.01308 | 0.005909 |
| S12 | −35.09315 | −0.05981 | 0.0111 | 0.01837 | −0.02576 | 0.01793 | −0.008302 |
| S13 | −9.846913 | −0.002459 | −0.01477 | 0.0142 | −0.009213 | 0.003825 | 0.001065 |
| S14 | 75.36404 | 0.02506 | −0.01717 | 0.009374 | −0.00492 | 0.001903 | −0.000511 |
| S15 | −1.857813 | −0.07187 | 0.03797 | −0.01566 | 0.004787 | −0.001 | 0.0001438 |
| S16 | −27.0145 | −0.04984 | 0.02472 | −0.009583 | 0.002653 | −0.000521 | 0.0000737 |

| Surface No. | G | H | J |
|---|---|---|---|
| S1 | −0.1275 | 0.04525 | 0.01127 |
| S2 | −0.1275 | 0.04525 | 0.01127 |
| S3 | 0.2842 | −0.2078 | 0.1047 |
| S4 | 5.176 | −4.197 | 2.43 |
| S5 | 8.778 | −6.41 | 3.412 |
| S6 | −2.302 | 1.388 | 0.6045 |
| S7 | −2.955 | 2.014 | 0.9924 |
| S8 | −1.077 | 0.5507 | 0.2039 |
| S9 | −0.6144 | 0.3759 | 0.1642 |
| S10 | −0.1556 | 0.06634 | 0.02057 |
| S11 | −0.001877 | 0.0003912 | 4.7E−05 |
| S12 | 0.002748 | 0.000664 | 0.0001167 |
| S13 | 0.000206 | −2.82E−05 | 2.755E−06 |
| S14 | 9.666E−05 | −1.3E−05 | 1.263E−06 |
| S15 | −1.45E−05 | 1.05E−06 | −5.44E−08 |
| S16 | −7.61E−06 | 5.776E−07 | −3.22E−08 |

Figure 3:
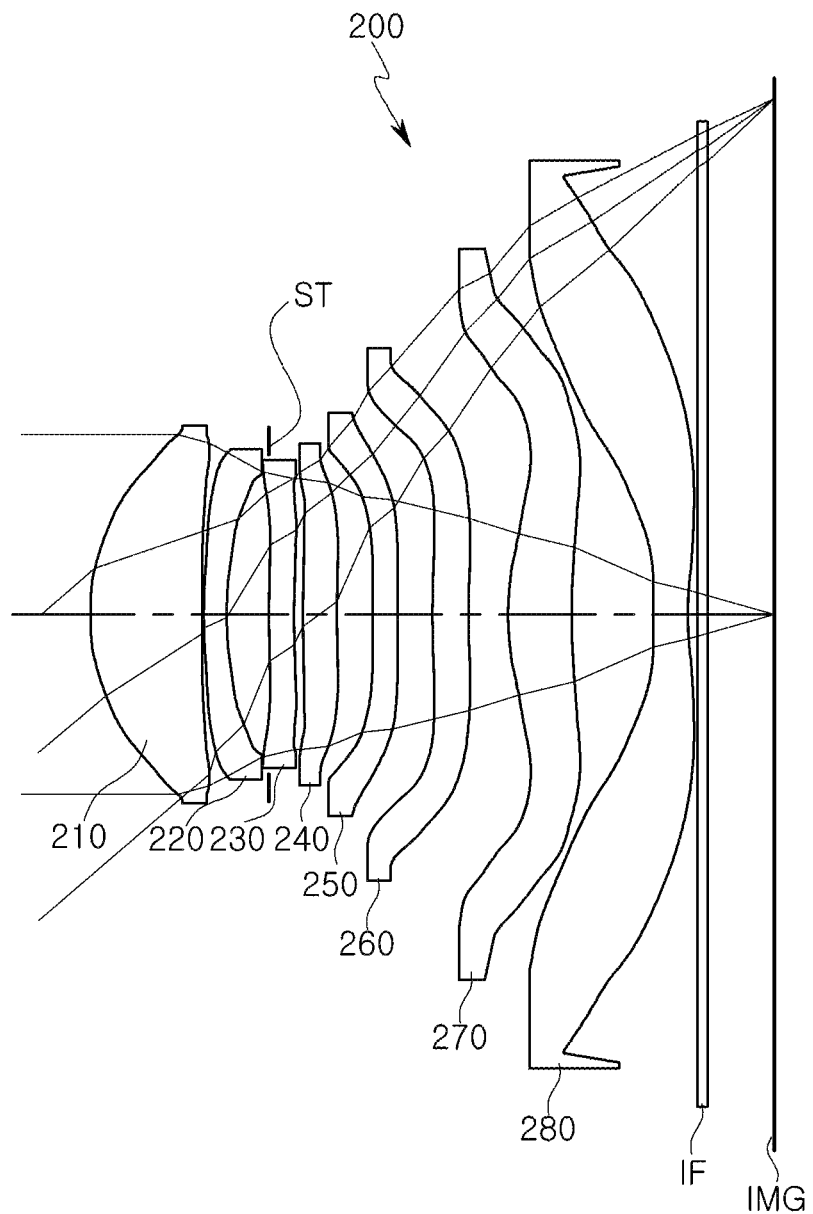
FIG. 3 is a diagram illustrating a second example of an imaging lens system.
Figure 4:
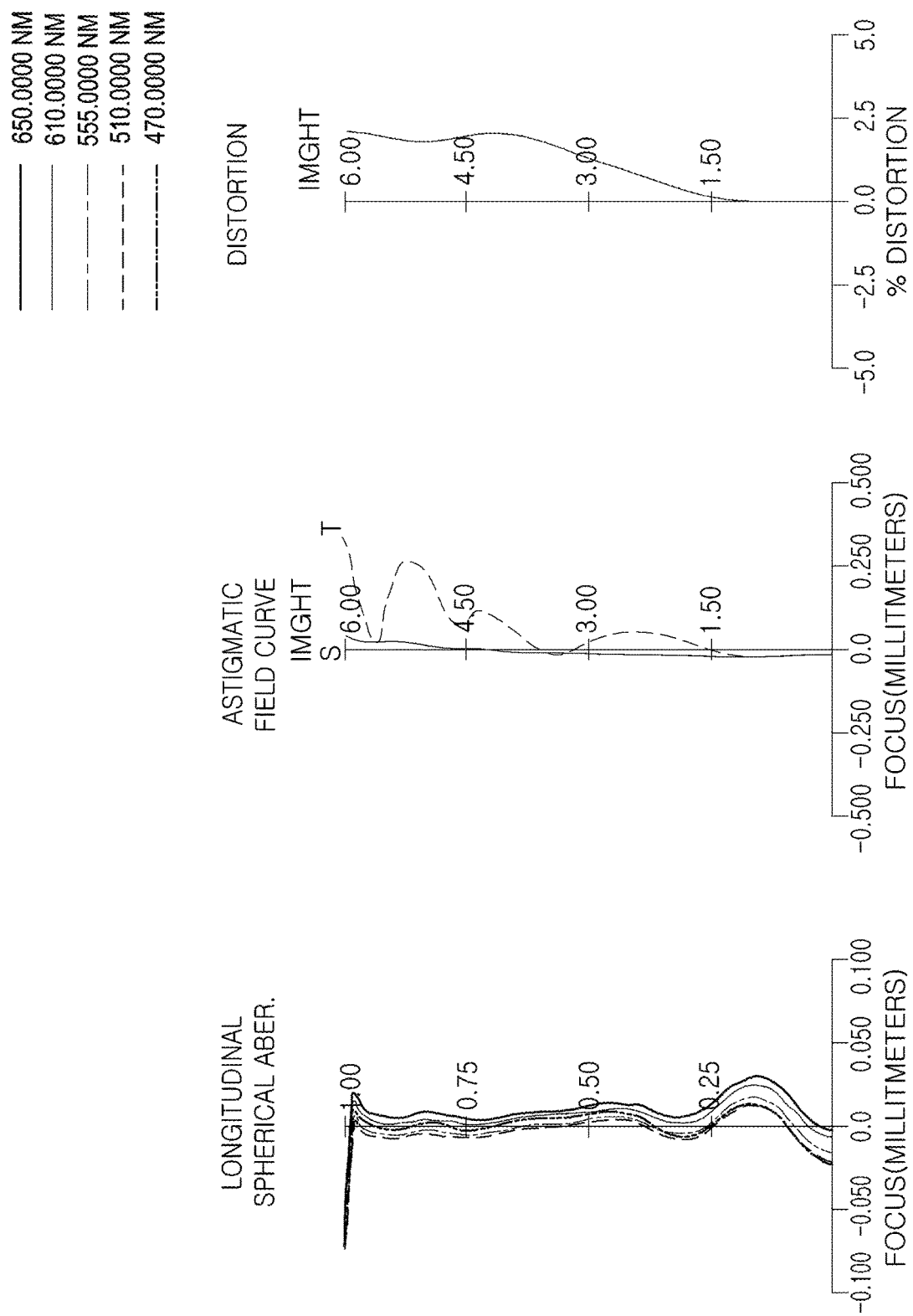
FIG. 4 is aberration curves of the imaging lens system illustrated in FIG. 3.

A second example of the imaging lens system will be described with reference to FIG. 3.

The imaging lens system 200 may include a first lens 210, a second lens 220, a third lens 230, a fourth lens 240, a fifth lens 250, a sixth lens 260, a seventh lens 270 and an eighth lens 280.

The first lens 210 may have positive refractive power, and may have a convex object-side surface and a concave image-side surface. The second lens 220 may have negative refractive power, and may have a convex object-side surface and a concave image-side surface. The third lens 230 may have negative refractive power, and may have a convex object-side surface and a concave image-side surface. The fourth lens 240 may have positive refractive power, and may have a convex object-side surface and a concave image-side surface. The fifth lens 250 may have negative refractive power, and may have a convex object-side surface and a concave image-side surface. An inflection point may be formed on at least one of an object-side surface and an image-side surface of the fifth lens 250. The sixth lens 260 may have negative refractive power, and may have a convex object-side surface and a concave image-side surface. An inflection point may be formed on at least one of an object-side surface and an image-side surface of the sixth lens 260. The seventh lens 270 may have positive refractive power, and may have a convex object-side surface and a concave image-side surface. An inflection point may be formed on at least one of an object-side surface and an image-side surface of the seventh lens 270. The eighth lens 280 may have negative refractive power, and may have a concave object-side surface and a concave image-side surface. An inflection point may be formed on at least one of an object-side surface and an image-side surface of the eighth lens 280.

The imaging lens system 200 may further include a filter IF, an image sensor IMG, and a stop ST. The filter IF may be disposed between the eighth lens 280 and the image sensor IMG. The image sensor IMG may provide a surface on which light refracted by the first lens 210 to the eighth lens 280 may be formed. One surface of the image sensor IMG may be substantially the same as a size of an imaging plane. For example, a diagonal length (IMGHT) of an imaging plane refers to a diagonal length of the image sensor IMG, and a height (IMGHT) of the imaging plane may refer to a distance from a center of an optical axis of the image sensor IMG to an edge. The stop ST may be disposed between the second lens 220 and the third lens 230.

Tables 3 and 4 list lens characteristics and aspherical values of the imaging lens system 200.

TABLE 3

| Surface No. | Note | Radius of Curvature | Thickness/ Distance | Refractive Index | Abbe Number |
|---|---|---|---|---|---|
| S1 | First Lens | 2.611 | 1.270 | 1.544 | 56.1 |
| S2 | | 13.027 | 0.030 | | |
| S3 | Second Lens | 8.424 | 0.257 | 1.671 | 19.2 |
| S4 | | 4.655 | 0.490 | | |
| S5 | Third Lens | 36.105 | 0.291 | 1.671 | 19.2 |
| S6 | | 17.852 | 0.102 | | |
| S7 | Fourth Lens | 18.642 | 0.410 | 1.544 | 56.1 |
| S8 | | 4987.988 | 0.381 | | |
| S9 | Fifth Lens | 26.448 | 0.300 | 1.616 | 25.8 |
| S10 | | 17.512 | 0.397 | | |
| S11 | Sixth Lens | 8.811 | 0.402 | 1.616 | 25.8 |
| S12 | | 5.707 | 0.451 | | |
| S13 | Seventh Lens | 3.069 | 0.746 | 1.544 | 56.1 |
| S14 | | 23.840 | 0.925 | | |
| S15 | Eighth Lens | −6.407 | 0.400 | 1.544 | 56.1 |
| S16 | | 4.437 | 0.118 | | |
| S17 | Filter | Infinity | 0.110 | 1.517 | 64.2 |
| S18 | | Infinity | 0.745 | | |
| S19 | Imaging Plane | Infinity | | | |

TABLE 4

| Surface No. | K | A | B | C | D | E | F |
|---|---|---|---|---|---|---|---|
| S1 | −0.977501 | −0.003935 | 0.03566 | −0.06648 | 0.07812 | −0.05719 | 0.02357 |
| S2 | 24.256772 | −0.01734 | 0.02382 | −0.04735 | 0.09105 | −0.1273 | 0.1247 |
| S3 | 16.447043 | −0.04114 | 0.1252 | −0.3314 | 0.5847 | −0.6813 | 0.5346 |
| S4 | 2.4777825 | −0.02548 | 0.1177 | −0.3338 | 0.515 | −0.3284 | −0.2047 |
| S5 | 0 | 0.0001756 | −0.08569 | 0.3416 | −0.9226 | 1.758 | −2.428 |
| S6 | 56.350823 | −0.01711 | 0.02414 | −0.09787 | 0.228 | −0.3404 | 0.3182 |
| S7 | 98.884228 | −0.03447 | 0.2124 | −1.059 | 3.234 | −6.491 | 8.929 |
| S8 | 99.00005 | −0.03892 | 0.08133 | −0.01505 | −0.6266 | 2.045 | −3.46 |
| S9 | 0 | −0.03305 | 0.006005 | −0.09955 | 0.3424 | −0.6687 | 0.8536 |
| S10 | 0 | −0.04115 | 0.02906 | −0.06185 | 0.089 | −0.09332 | 0.07136 |
| S11 | 0 | −0.08603 | 0.09214 | −0.08082 | 0.05511 | −0.03092 | 0.01465 |
| S12 | −39.38114 | −0.1047 | 0.1 | −0.07676 | 0.0443 | −0.01861 | 0.005745 |
| S13 | −7.365153 | −0.02249 | 0.01129 | −0.00247 | −0.002451 | 0.00202 | −0.000725 |
| S14 | 23.383791 | 0.01202 | −0.007542 | 0.007938 | −0.006811 | 0.003202 | −0.000929 |
| S15 | −1.492134 | −0.07336 | 0.04525 | −0.0173 | 0.003788 | −0.000412 | 2.16E−06 |
| S16 | −19.10332 | −0.06043 | 0.03583 | −0.01475 | 0.004065 | −0.000781 | 0.0001088 |

| Surface No. | G | H | J |
|---|---|---|---|
| S1 | −0.001832 | −0.003927 | 0.002605 |
| S2 | −0.08725 | 0.04424 | −0.01632 |
| S3 | −0.2841 | 0.09972 | 0.02093 |
| S4 | 0.6032 | −0.5729 | 0.3107 |
| S5 | 2.459 | −1.829 | 0.9952 |
| S6 | −0.173 | 0.03554 | 0.01898 |
| S7 | −8.669 | 6.038 | −3.03 |
| S8 | 3.728 | −2.737 | 1.404 |
| S9 | −0.7539 | 0.4727 | −0.2123 |

TABLE 4-continued

| | | | |
|---|---|---|---|
| S10 | −0.03976 | 0.01616 | −0.004776 |
| S11 | −0.005795 | 0.001809 | −0.00042 |
| S12 | −0.001373 | 0.0002715 | −4.57E−05 |
| S13 | 0.0001571 | −2.25E−05 | 2.215E−06 |
| S14 | 0.0001797 | −2.41E−05 | 2.286E−06 |
| S15 | 5.752E−06 | −8.72E−07 | 7.101E−08 |
| S16 | −1.12E−05 | 8.63E−07 | −4.94E−08 |

Figure 5:
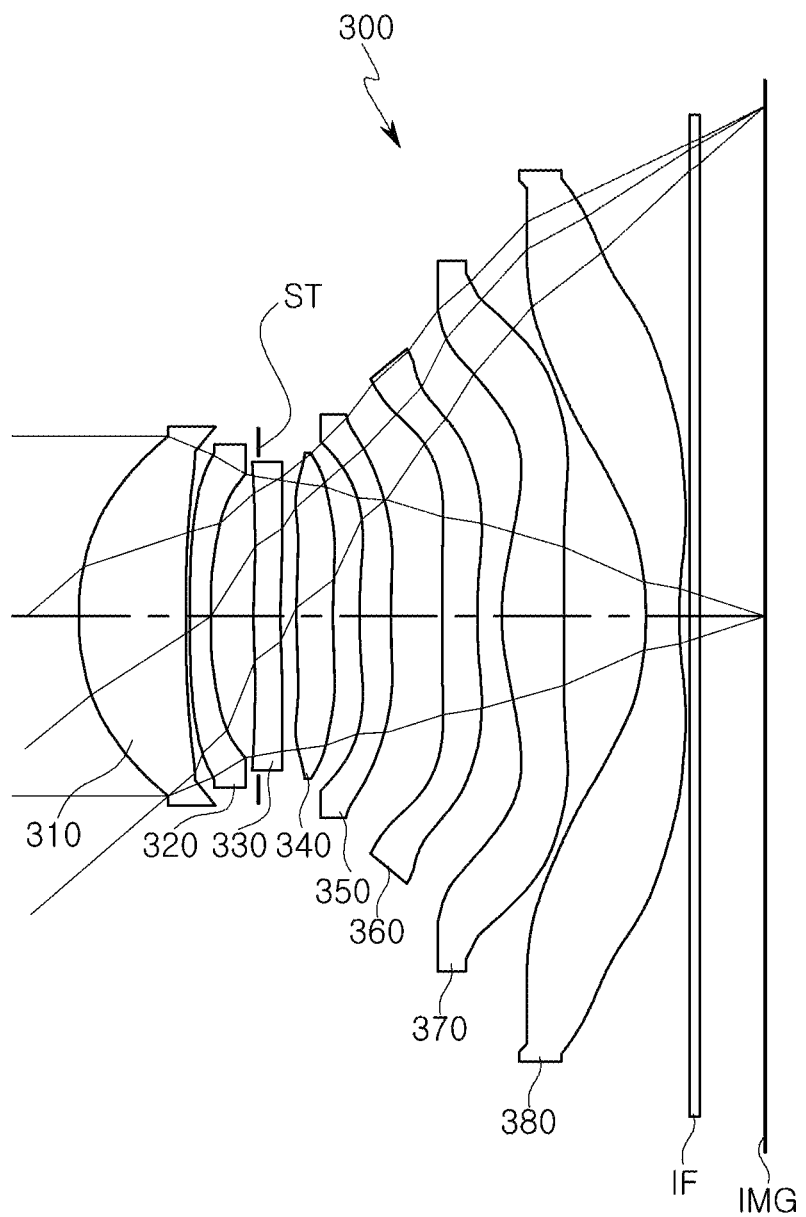
FIG. 5 is a diagram illustrating a third example of an imaging lens system.
Figure 6:
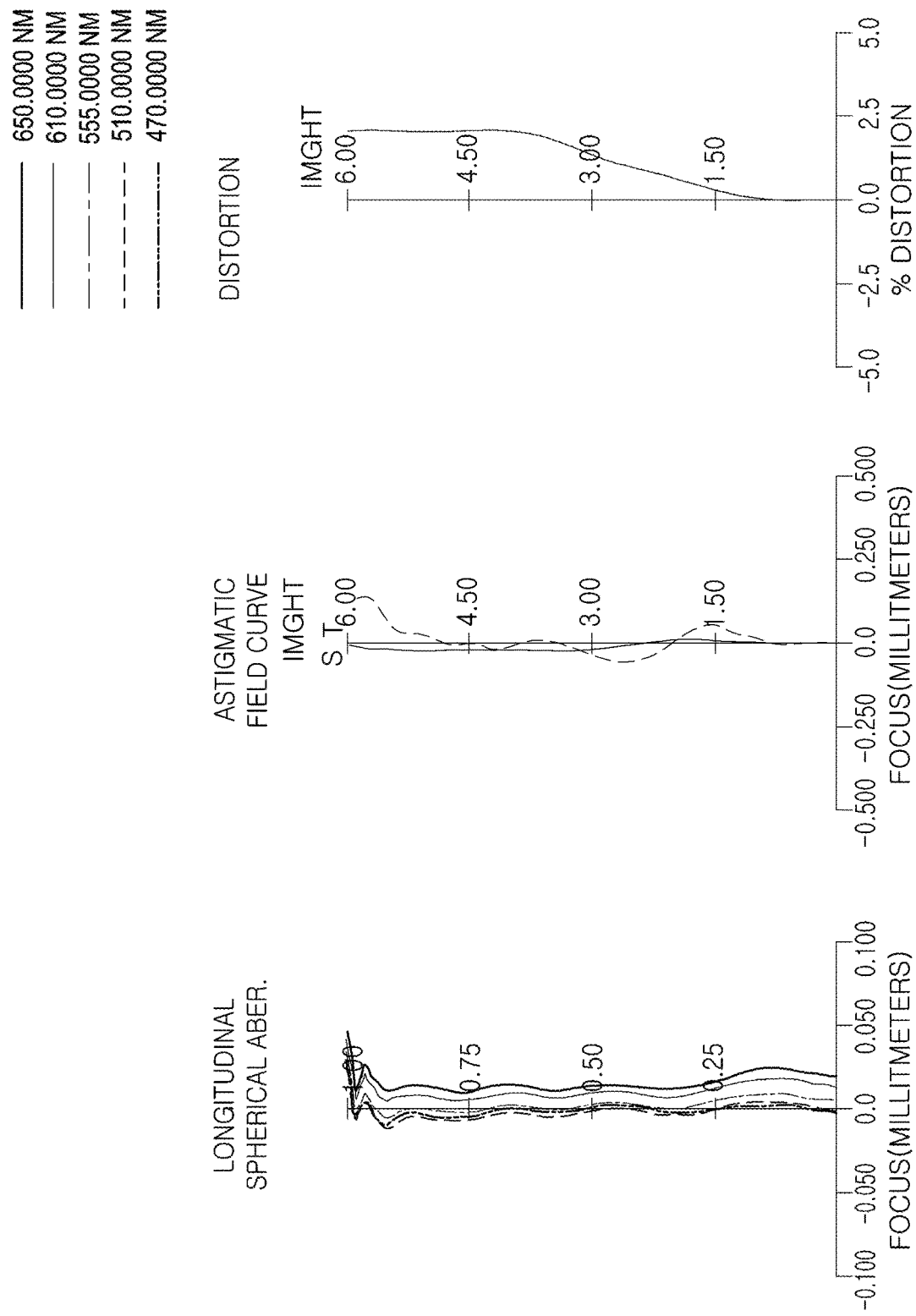
FIG. 6 is aberration curves of the imaging lens system illustrated in FIG. 5.

A third example of the imaging lens system will be described with reference to FIG. 5.

The imaging lens system 300 may include a first lens 310, a second lens 320, a third lens 330, a fourth lens 340, a fifth lens 350, a sixth lens 360, a seventh lens 370 and an eighth lens 380.

The first lens 310 may have positive refractive power, and may have a convex object-side surface and a concave image-side surface. The second lens 320 may have negative refractive power, and may have a convex object-side surface and a concave image-side surface. The third lens 330 may have negative refractive power, and may have a convex object-side surface and a concave image-side surface. The fourth lens 340 may have positive refractive power, and may have a convex object-side surface and a concave image-side surface. The fifth lens 350 may have positive refractive power, and may have a convex object-side surface and a concave image-side surface. An inflection point may be formed on at least one of an object-side surface and an image-side surface of the fifth lens 350. The sixth lens 360 may have negative refractive power, and may have a convex object-side surface and a concave image-side surface. An inflection point may be formed on at least one of an object-side surface and an image-side surface of the sixth lens 360. The seventh lens 370 may have positive refractive power, and may have a convex object-side surface and a concave image-side surface. An inflection point may be formed on at least one of an object-side surface and an image-side surface of the seventh lens 370. The eighth lens 380 may have negative refractive power, and may have a concave object-side surface and a concave image-side surface. An inflection point may be formed on at least one of an object-side surface and an image-side surface of the eighth lens 380.

The imaging lens system 300 may further include a filter IF, an image sensor IMG, and a stop ST. The filter IF may be disposed between the eighth lens 380 and the image sensor IMG. The image sensor IMG may provide a surface on which light refracted by the first lens 310 to the eighth lens 380 may be formed. One surface of the image sensor IMG may be substantially the same as a size of an imaging plane. For example, a diagonal length (IMGHT) of an imaging plane refer to a diagonal length of the image sensor IMG, and a height (IMGHT) of the imaging plane may refer to a distance from a center of an optical axis of the image sensor IMG to an edge. The stop ST may be disposed between the second lens 320 and the third lens 330.

Tables 5 and 6 list lens characteristics and aspherical values of the imaging lens system 300.

TABLE 5

| Surface No. | Note | Radius of Curvature | Thickness/ Distance | Refractive Index | Abbe Number |
|---|---|---|---|---|---|
| S1 | First Lens | 2.608 | 1.220 | 1.544 | 56.1 |
| S2 | | 12.748 | 0.030 | | |
| S3 | Second Lens | 8.166 | 0.250 | 1.671 | 19.2 |
| S4 | | 4.738 | 0.511 | | |
| S5 | Third Lens | 46.929 | 0.314 | 1.671 | 19.2 |
| S6 | | 18.435 | 0.163 | | |
| S7 | Fourth Lens | 22.706 | 0.420 | 1.544 | 56.1 |
| S8 | | 50.133 | 0.304 | | |
| S9 | Fifth Lens | 10.445 | 0.353 | 1.544 | 56.1 |
| S10 | | 13.329 | 0.565 | | |
| S11 | Sixth Lens | 8.426 | 0.424 | 1.568 | 37.4 |
| S12 | | 4.055 | 0.271 | | |
| S13 | Seventh Lens | 2.781 | 0.709 | 1.544 | 56.1 |
| S14 | | 62.484 | 0.925 | | |
| S15 | Eighth Lens | −5.963 | 0.400 | 1.544 | 56.1 |
| S16 | | 4.543 | 0.112 | | |
| S17 | Filter | Infinity | 0.110 | 1.517 | 64.2 |
| S18 | | Infinity | 0.765 | | |
| S19 | Imaging Plane | Infinity | | | |

TABLE 6

| Surface No. | K | A | B | C | D | E | F |
|---|---|---|---|---|---|---|---|
| S1 | −1.02182 | −0.01896 | 0.1021 | −0.2305 | 0.3375 | −0.3375 | 0.239 |
| S2 | 27.483091 | −0.02125 | 0.02647 | −0.04209 | 0.08433 | −0.1286 | 0.1344 |
| S3 | 16.571645 | −0.0269 | 0.02934 | −0.02785 | 0.005501 | 0.06759 | −0.1621 |
| S4 | 2.329664 | −0.008104 | 0.01857 | −0.07846 | 0.2349 | −0.4188 | 0.4574 |
| S5 | 0 | 0.03542 | −0.3975 | 1.734 | −4.822 | 9.088 | −12.06 |
| S6 | 95.620843 | −0.04713 | 0.2007 | −0.809 | 2.045 | −3.463 | −4.085 |
| S7 | 92.803604 | −0.04517 | 0.2372 | −1.015 | 2.742 | −4.991 | 6.357 |
| S8 | 19.623148 | −0.0422 | 0.1464 | −0.5006 | 1.076 | −1.54 | 1.523 |
| S9 | 0 | −0.03346 | 0.01336 | −0.1054 | 0.32 | −0.589 | 0.7273 |
| S10 | 0 | −0.03637 | 0.04988 | −0.1559 | 0.2794 | −0.3299 | 0.2711 |
| S11 | 0 | −0.05656 | 0.03784 | −0.02001 | 0.003531 | 0.003559 | −0.003956 |
| S12 | −37.93685 | −0.06085 | 0.01424 | 0.01542 | −0.02468 | 0.01805 | −0.00854 |
| S13 | −9.92841 | −0.006148 | −0.01069 | 0.01178 | −0.008163 | 0.003492 | 0.000994 |
| S14 | 46.8868 | 0.02276 | −0.0168 | 0.01054 | −0.005761 | 0.002195 | −0.000576 |
| S15 | −1.893815 | −0.07156 | 0.03583 | −0.01332 | 0.003704 | −0.000717 | 9.637E−05 |
| S16 | −25.29874 | −0.04909 | 0.02346 | −0.008608 | 0.002275 | −0.000431 | 5.922E−05 |

TABLE 6-continued

| Surface No. | G | H | J |
|---|---|---|---|
| S1 | −0.1221 | 0.04541 | −0.01224 |
| S2 | −0.09851 | 0.05187 | −0.01979 |
| S3 | 0.1991 | −0.1548 | 0.08107 |
| S4 | −0.2903 | 0.0682 | 0.04808 |
| S5 | 11.52 | −8.02 | 4.072 |
| S6 | −3.434 | 2.081 | 0.9096 |
| S7 | −5.802 | 3.841 | −1.847 |
| S8 | −1.066 | 0.5322 | −0.1886 |
| S9 | −0.6276 | 0.385 | −0.1686 |
| S10 | −0.1595 | 0.06818 | −0.02119 |
| S11 | 0.00219 | −0.000802 | 0.000204 |
| S12 | 0.002828 | −0.000672 | 0.001149 |
| S13 | 0.000197 | −2.78E−05 | 2.817E−06 |
| S14 | 0.0001064 | −1.41E−05 | 1.345E−06 |
| S15 | −9.14E−06 | 6.184E−07 | −2.98E−08 |
| S16 | −5.95E−06 | 4.389E−07 | −2.37E−08 |

Figure 7:
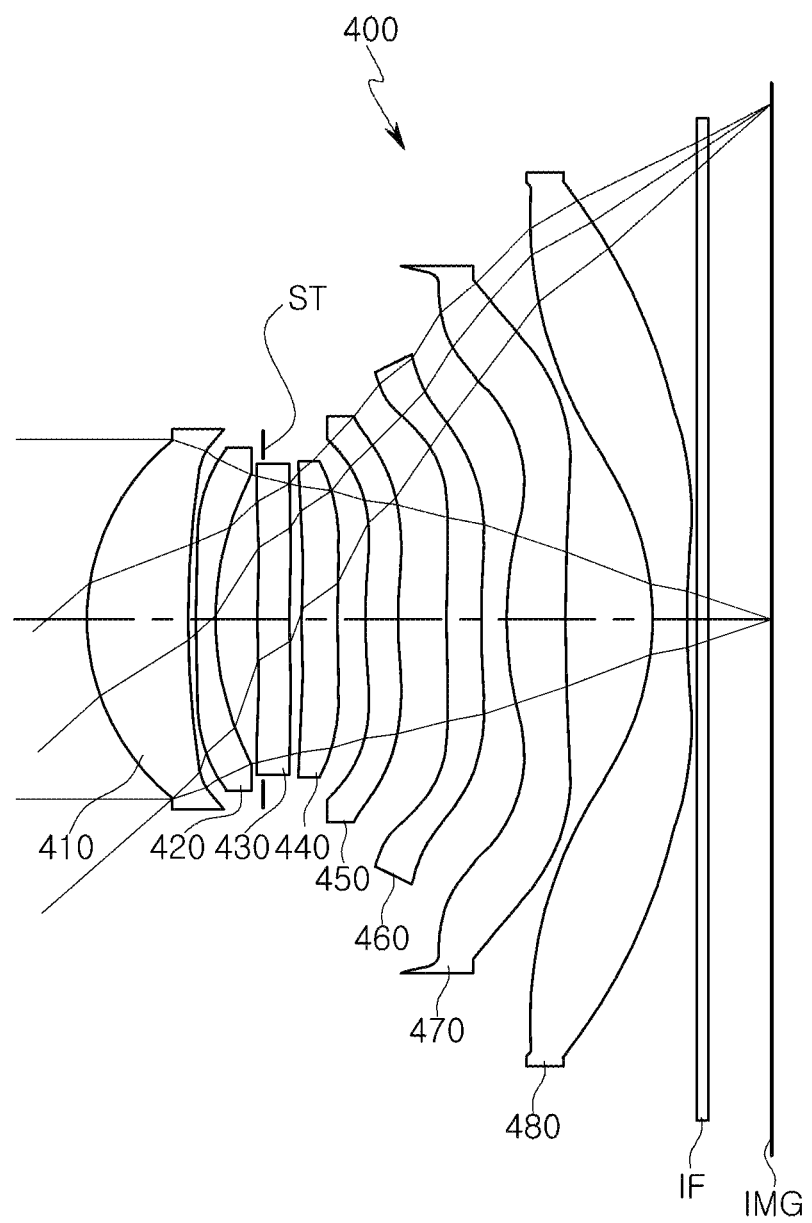
FIG. 7 is a diagram illustrating a fourth example of an imaging lens system.
Figure 8:
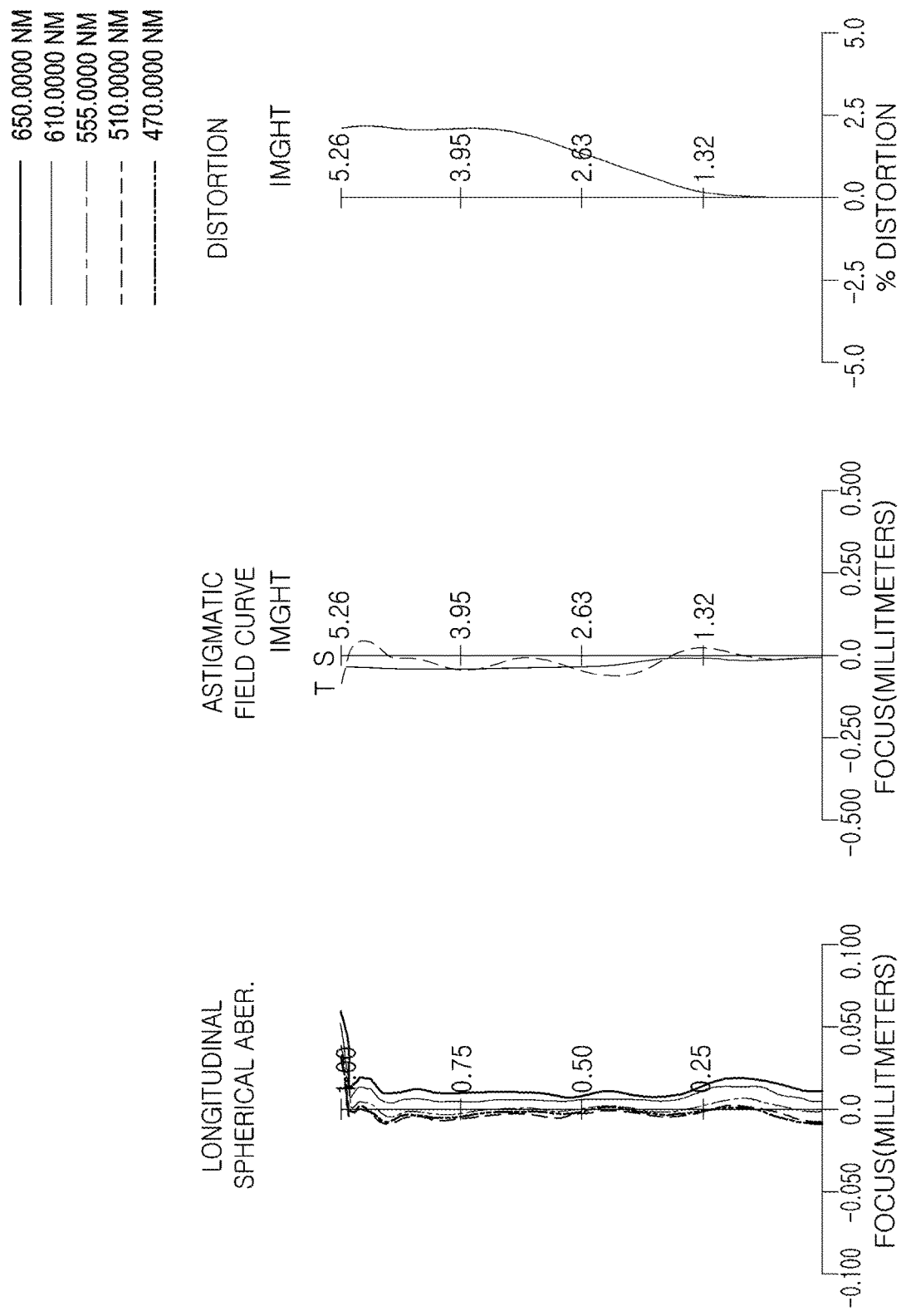
FIG. 8 is aberration curves of the imaging lens system illustrated in FIG. 7.

A fourth example of the imaging lens system will be described with reference to FIG. 7.

The imaging lens system 400 may include a first lens 410, a second lens 420, a third lens 430, a fourth lens 440, a fifth lens 450, a sixth lens 460, a seventh lens 470 and an eighth lens 480.

The first lens 410 may have positive refractive power, and may have a convex object-side surface and a concave image-side surface. The second lens 420 may have negative refractive power, and may have a convex object-side surface and a concave image-side surface. The third lens 430 may have negative refractive power, and may have a convex object-side surface and a concave image-side surface. The fourth lens 440 may have positive refractive power, and may have a convex object-side surface and a concave image-side surface. The fifth lens 450 may have positive refractive power, and may have a convex object-side surface and a concave image-side surface. An inflection point may be formed on at least one of an object-side surface and an image-side surface of the fifth lens 450. The sixth lens 460 may have negative refractive power, and may have a convex object-side surface and a concave image-side surface. An inflection point may be formed on at least one of an object-side surface and an image-side surface of the sixth lens 460. The seventh lens 470 may have positive refractive power, and may have a convex object-side surface and a concave image-side surface. An inflection point may be formed on at least one of an object-side surface and an image-side surface of the seventh lens 470. The eighth lens 480 may have negative refractive power, and may have a concave object-side surface and a concave image-side surface. An inflection point may be formed on at least one of an object-side surface and an image-side surface of the eighth lens 480.

The imaging lens system 400 may further include a filter IF, an image sensor IMG, and a stop ST. The filter IF may be disposed between the eighth lens 480 and the image sensor IMG. The image sensor IMG may provide a surface on which light refracted by the first lens 410 to the eighth lens 480 may be formed. One surface of the image sensor IMG may be substantially the same as a size of an imaging plane. For example, a diagonal length (IMGHT) of an imaging plane refer to a diagonal length of the image sensor IMG, and a height (IMGHT) of the imaging plane may refer to a distance from a center of an optical axis of the image sensor IMG to an edge. The stop ST may be disposed between the second lens 420 and the third lens 430.

Tables 7 and 8 list lens characteristics and aspherical values of the imaging lens system 400.

TABLE 7

| Surface No. | Note | Radius of Curvature | Thickness/ Distance | Refractive Index | Abbe Number |
|---|---|---|---|---|---|
| S1 | First Lens | 2.278 | 1.054 | 1.544 | 56.1 |
| S2 | | 11.127 | 0.031 | | |
| S3 | Second Lens | 7.130 | 0.218 | 1.671 | 19.2 |
| S4 | | 4.148 | 0.445 | | |
| S5 | Third Lens | 43.221 | 0.285 | 1.671 | 19.2 |
| S6 | | 16.173 | 0.141 | | |
| S7 | Fourth Lens | 19.509 | 0.368 | 1.544 | 56.1 |
| S8 | | 46.623 | 0.274 | | |
| S9 | Fifth Lens | 9.573 | 0.309 | 1.544 | 56.1 |
| S10 | | 12.167 | 0.485 | | |
| S11 | Sixth Lens | 7.337 | 0.337 | 1.568 | 37.4 |
| S12 | | 3.561 | 0.239 | | |
| S13 | Seventh Lens | 2.439 | 0.628 | 1.544 | 56.1 |
| S14 | | 46.270 | 0.829 | | |
| S15 | Eighth Lens | −5.093 | 0.349 | 1.544 | 56.1 |
| S16 | | 4.049 | 0.108 | | |
| S17 | Filter | Infinity | 0.110 | 1.517 | 64.2 |
| S18 | | Infinity | 0.634 | | |
| S19 | Imaging Plane | Infinity | | | |

TABLE 8

| Surface No. | K | A | B | C | D | E | F |
|---|---|---|---|---|---|---|---|
| S1 | −1.023516 | −0.02894 | 0.2027 | −0.6008 | 1.16 | −1.535 | 1.441 |
| S2 | 27.60251 | −0.0322 | 0.05346 | −0.1175 | 0.3101 | −0.6105 | 0.824 |
| S3 | 16.582787 | −0.04328 | 0.1124 | −0.4925 | 1.694 | −3.803 | 5.765 |
| S4 | 2.3368477 | −0.009209 | 0.0766 | −0.8282 | 4.318 | −13.26 | 26.77 |
| S5 | 0 | 0.05678 | −0.8285 | 4.794 | −17.72 | 44.42 | −78.44 |

TABLE 8-continued

| | | | | | | | |
|---|---|---|---|---|---|---|---|
| S6 | 94.491316 | −0.07431 | 0.416 | −2.152 | 7.037 | −15.48 | 23.78 |
| S7 | 96.207272 | −0.0687 | 0.4581 | −2.535 | 8.925 | −21.24 | 35.44 |
| S8 | 4.0322931 | −0.0659 | 0.3025 | −1.362 | 3.899 | −7.469 | 9.943 |
| S9 | 0 | −0.05092 | 0.02675 | −0.2788 | 1.116 | −2.711 | 4.416 |
| S10 | 0 | −0.05276 | 0.09504 | −0.3977 | 0.936 | −1.446 | 1.554 |
| S11 | 0 | −0.08309 | 0.06956 | −0.04357 | 0.003816 | 0.02101 | −0.02496 |
| S12 | −36.43215 | −0.092 | 0.02633 | 0.04399 | −0.08881 | 0.08461 | −0.05253 |
| S13 | −9.867493 | −0.007045 | −0.02347 | 0.03144 | −0.02757 | 0.01523 | −0.005656 |
| S14 | 45.614021 | 0.03328 | −0.03125 | 0.02444 | −0.01703 | 0.008392 | −0.002865 |
| S15 | 1.943408 | −0.1096 | 0.07265 | −0.03561 | 0.0131 | −0.003374 | 0.0006065 |
| S16 | −27.21477 | −0.07452 | 0.04654 | −0.0222 | 0.007632 | −0.001888 | 0.0003391 |

| Surface No. | G | H | J |
|---|---|---|---|
| S1 | −0.9772 | 0.483 | −0.1734 |
| S2 | −0.7824 | 0.5349 | −0.2654 |
| S3 | −6.123 | 4.654 | −2.546 |
| S4 | −37.46 | 37.31 | −26.65 |
| S5 | 99.74 | −92.35 | 62.29 |
| S6 | −26.1 | 20.7 | −11.86 |
| S7 | −42.4 | 36.84 | −23.27 |
| S8 | −9.427 | 6.435 | −3.16 |
| S9 | −5.026 | 4.067 | −2.35 |
| S10 | −1.196 | 0.6686 | −0.2719 |
| S11 | 0.01691 | −0.007815 | 0.002547 |
| S12 | 0.02291 | −0.007192 | 0.001627 |
| S13 | 0.001472 | −0.000274 | 3.668E−05 |
| S14 | 0.0006917 | −0.00012 | 0.000015 |
| S15 | −7.74E−05 | 7.084E−06 | −4.67E−07 |
| S16 | −4.46E−05 | 4.318E−06 | −3.07E−07 |

Figure 9:
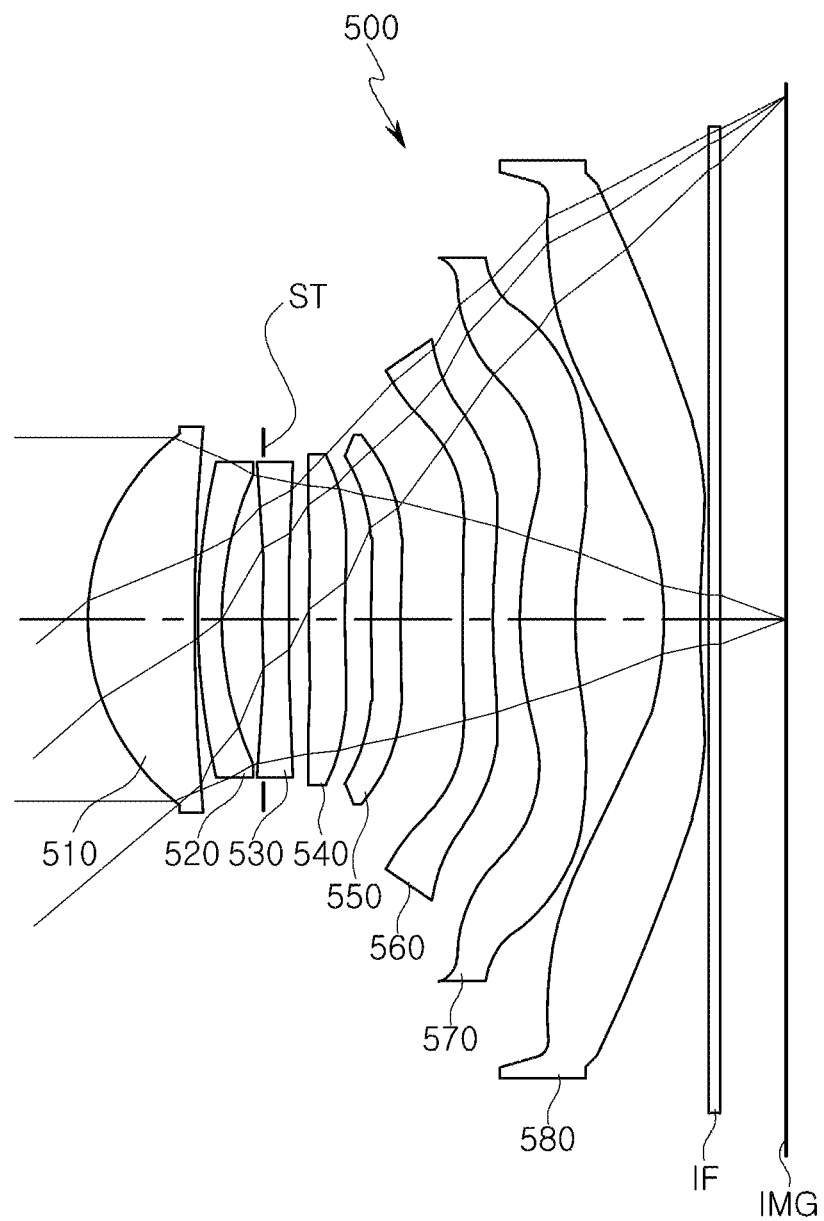
FIG. 9 is a diagram illustrating a fifth example of an imaging lens system.
Figure 10:
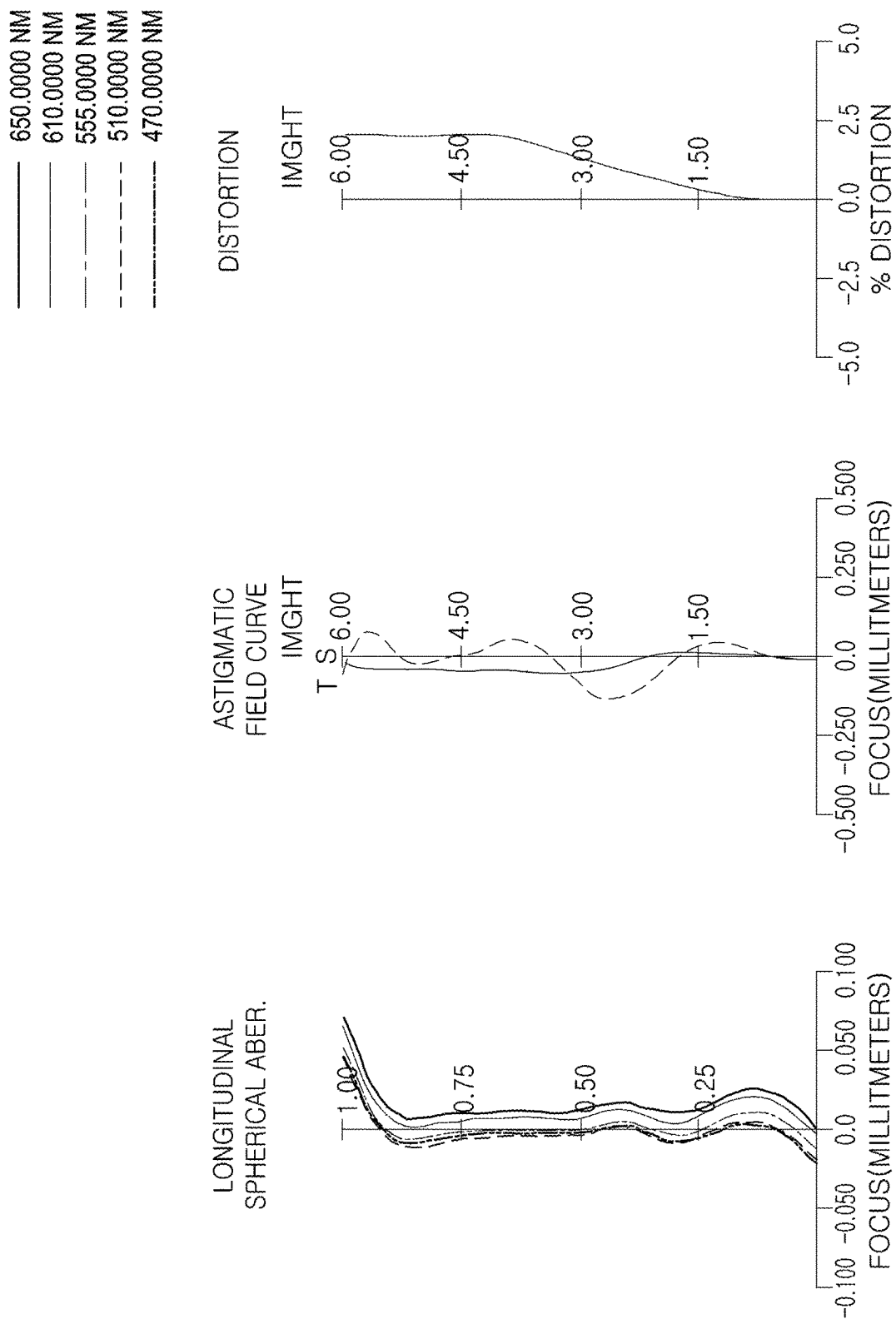
FIG. 10 is aberration curves of the imaging lens system illustrated in FIG. 9.

A fifth example of the imaging lens system will be described with reference to FIG. 9.

The imaging lens system 500 may include a first lens 510, a second lens 520, a third lens 530, a fourth lens 540, a fifth lens 550, a sixth lens 560, a seventh lens 570 and an eighth lens 580.

The first lens 510 may have positive refractive power, and may have a convex object-side surface and a concave image-side surface. The second lens 520 may have negative refractive power, and may have a convex object-side surface and a concave image-side surface. The third lens 530 may have negative refractive power, and may have a convex object-side surface and a concave image-side surface. The fourth lens 540 may have negative refractive power, and may have a convex object-side surface and a concave image-side surface. The fifth lens 550 may have positive refractive power, and may have a convex object-side surface and a concave image-side surface. An inflection point may be formed on at least one of an object-side surface and an image-side surface of the fifth lens 550. The sixth lens 560 may have negative refractive power, and may have a convex object-side surface and a concave image-side surface. An inflection point may be formed on at least one of an object-side surface and an image-side surface of the sixth lens 560. The seventh lens 570 may have positive refractive power, and may have a convex object-side surface and a concave image-side surface. An inflection point may be formed on at least one of an object-side surface and an image-side surface of the seventh lens 570. The eighth lens 580 may have negative refractive power, and may have a concave object-side surface and a concave image-side surface. An inflection point may be formed on at least one of an object-side surface and an image-side surface of the eighth lens 580.

The imaging lens system 500 may further include a filter IF, an image sensor IMG, and a stop ST. The filter IF may be disposed between the eighth lens 580 and the image sensor IMG. The image sensor IMG may provide a surface on which the light refracted by the first lens 510 to the eighth lens 580 may be formed. One surface of the image sensor IMG may be substantially the same as a size of an imaging plane. For example, a diagonal length (IMGHT) of an imaging plane refers to a diagonal length of the image sensor IMG, and a height (IMGHT) of the imaging plane may refer to a distance from a center of an optical axis of the image sensor IMG to an edge. The stop ST may be disposed between the second lens 520 and the third lens 530.

Tables 9 and 10 list lens characteristics and aspherical values of the imaging lens system 500.

TABLE 9

| Surface No. | Note | Radius of Curvature | Thickness/ Distance | Refractive Index | Abbe Number |
|---|---|---|---|---|---|
| S1 | First Lens | 2.603 | 1.198 | 1.544 | 56.1 |
| S2 | | 12.458 | 0.048 | | |
| S3 | Second Lens | 8.028 | 0.250 | 1.671 | 19.2 |
| S4 | | 4.657 | 0.490 | | |
| S5 | Third Lens | 39.910 | 0.293 | 1.671 | 19.2 |
| S6 | | 17.608 | 0.214 | | |
| S7 | Fourth Lens | 24.041 | 0.436 | 1.568 | 37.4 |
| S8 | | 22.918 | 0.254 | | |
| S9 | Fifth Lens | 11.009 | 0.397 | 1.544 | 56.1 |
| S10 | | 28.805 | 0.620 | | |
| S11 | Sixth Lens | 8.049 | 0.386 | 1.568 | 37.4 |
| S12 | | 4.333 | 0.267 | | |
| S13 | Seventh Lens | 2.562 | 0.629 | 1.544 | 56.1 |
| S14 | | 9.500 | 0.980 | | |
| S15 | Eighth Lens | −6.799 | 0.400 | 1.544 | 56.1 |
| S16 | | 4.722 | 0.110 | | |
| S17 | Filter | Infinity | 0.110 | 1.517 | 64.2 |
| S18 | | Infinity | 0.759 | | |
| S19 | Imaging Plane | Infinity | | | |

TABLE 10

| Surface No. | K | A | B | C | D | E | F |
|---|---|---|---|---|---|---|---|
| S1 | 1.028837 | −0.02409 | 0.1446 | −0.3787 | 0.6314 | −0.7099 | 0.5594 |
| S2 | 27.139418 | −0.01912 | 0.01984 | −0.01858 | 0.03317 | −0.06354 | 0.0825 |
| S3 | 16.56626 | −0.03611 | 0.08325 | −0.1934 | 0.3467 | −0.4275 | 0.3499 |
| S4 | 2.3619195 | −0.006635 | −0.02015 | 0.1695 | −0.6002 | 1.364 | −2.14 |
| S5 | 0 | 0.03964 | −0.4617 | 2.104 | −6.062 | 11.76 | −16 |
| S6 | 98.932938 | −0.05194 | 0.2269 | −0.8855 | 2.193 | −3.673 | 4.319 |
| S7 | 92.330151 | −0.03483 | 0.1489 | −0.6154 | 1.616 | −2.873 | 3.577 |
| S8 | −98.98639 | −0.0416 | 0.134 | −0.4795 | 1.094 | −1.666 | 1.759 |
| S9 | 0 | −0.03919 | 0.02504 | −0.1109 | 0.3044 | −0.5401 | 0.652 |
| S10 | 0 | −0.03933 | 0.05215 | −0.1519 | 0.2678 | −0.3165 | 0.2629 |
| S11 | 0 | −0.06085 | 0.0609 | −0.05644 | 0.0367 | −0.01688 | 0.005064 |
| S12 | −36.84334 | −0.08749 | 0.07584 | −0.05801 | 0.03358 | −0.01451 | 0.004584 |
| S13 | −9.956325 | −0.01164 | 6.404E−05 | 0.000979 | −0.002315 | 0.001509 | −0.000532 |
| S14 | −84.33771 | 0.02575 | −0.01685 | 0.007841 | −0.00402 | 0.001651 | −0.000474 |
| S15 | −1.549727 | −0.06796 | 0.03522 | −0.01412 | 0.004139 | −0.000819 | 0.0001098 |
| S16 | −23.9777 | −0.04939 | 0.02417 | −0.009403 | 0.002602 | −0.000508 | 0.0000709 |

| Surface No. | G | H | J |
|---|---|---|---|
| S1 | −0.3161 | 0.1294 | −0.03841 |
| S2 | −0.07178 | 0.04322 | −0.01831 |
| S3 | −0.18 | 0.04606 | 0.005663 |
| S4 | 2.391 | −1.928 | 1.124 |
| S5 | 15.64 | −11.12 | 5.753 |
| S6 | −3.642 | 2.225 | −0.9845 |
| S7 | −3.193 | 2.069 | −0.9745 |
| S8 | −1.327 | 0.7252 | −0.2882 |
| S9 | −0.5516 | 0.3318 | −0.1424 |
| S10 | −0.1574 | 0.06872 | −0.0219 |
| S11 | −0.000733 | −0.0001 | 8.014E−05 |
| S12 | −0.001033 | 0.0001598 | −1.57E−05 |
| S13 | 0.0001191 | −1.81E−05 | 1.903E−06 |
| S14 | 9.442E−05 | −1.33E−05 | 1.33E−06 |
| S15 | −1.01E−05 | 6.502E−07 | −2.85E−08 |
| S16 | −7.18E−06 | 5.316E−07 | −2.87E−08 |

Tables 11 and 12 list optical properties values and values of conditional expressions of the imaging lens system of the first to fifth examples. In Table 11, BFL refers to a distance from an image-side surface of the eighth lens to an imaging plane.

TABLE 11

| Note | First Example | Second Example | Third Example | Fourth Example | Fifth Example |
|---|---|---|---|---|---|
| TTL | 7.825 | 7.825 | 7.845 | 6.846 | 7.839 |
| BFL | 0.963 | 0.974 | 0.987 | 0.852 | 0.979 |
| f number | 1.590 | 1.590 | 1.590 | 1.590 | 1.620 |
| FOV | 82.200 | 82.200 | 82.200 | 82.100 | 81.800 |
| f | 6.690 | 6.697 | 6.698 | 5.850 | 6.698 |
| f1 | 5.731 | 5.735 | 5.761 | 5.035 | 5.773 |
| f2 | −15.473 | −15.788 | −16.912 | −14.867 | −16.584 |
| f3 | −57.347 | −52.452 | −45.011 | −38.305 | −46.622 |
| f4 | 77.623 | 34.274 | 75.613 | 61.156 | −999.00 |
| f5 | 74.249 | −84.707 | 84.752 | 78.932 | 32.352 |
| f6 | −13.869 | −27.493 | −14.204 | −12.534 | −17.077 |
| f7 | 5.358 | 6.371 | 5.310 | 4.692 | 6.220 |
| f8 | −4.672 | −4.740 | −4.660 | −4.077 | −5.038 |

TABLE 12

| Conditional Expression | First Example | Second Example | Third Example | Fourth Example | Fifth Example |
|---|---|---|---|---|---|
| TTL/IMGHT | 1.3042 | 1.3042 | 1.3074 | 1.3015 | 1.3065 |
| TTL/FOV | 0.0952 | 0.0952 | 0.0954 | 0.0834 | 0.0958 |
| T8/T7 | 0.5817 | 0.5359 | 0.5643 | 0.5560 | 0.6360 |
| FOV | 82.2000 | 82.2000 | 82.2000 | 82.1000 | 81.8000 |
| f1/f | 0.8566 | 0.8564 | 0.8601 | 0.8606 | 0.8619 |
| f2/f1 | −2.7001 | −2.7527 | −2.9354 | −2.9530 | −2.8727 |
| f3/f2 | 0.2698 | 0.3010 | 0.3757 | 0.3881 | 0.3557 |
| f6/f7 | −2.5887 | −4.3157 | −2.6751 | −2.6714 | −2.7457 |
| f7/f8 | −1.1468 | −1.3439 | −1.1393 | −1.1508 | −1.2346 |
| f1/f7 | 1.0696 | 0.9003 | 1.0850 | 1.0731 | 0.9282 |
| f1/f8 | −1.2267 | −1.2099 | −1.2362 | −1.2349 | −1.1460 |
| |f3/f5| | 0.7724 | 0.6192 | 0.5311 | 0.4853 | 1.4411 |
| (V2 + V3)/2 | 19.2000 | 19.2000 | 19.2000 | 19.2000 | 19.2000 |
| (R11 + R12)/(R11 − R12) | 2.8396 | 4.6766 | 2.8553 | 2.8855 | 3.3322 |
| DL1L4/DL5L8 | 0.8073 | 0.7870 | 0.7977 | 0.8004 | 0.7959 |
| f/IMGHT | 1.115 | 1.116 | 1.116 | 1.112 | 1.116 |
| (R5 + R6)/(R5 − R6) | 3.1296 | 2.9560 | 2.2940 | 2.1959 | 2.5791 |
| (R13 + R14)/(R13 − R14) | −1.1253 | −1.2955 | −1.0932 | −1.1113 | −1.7385 |
| f/f7 | 1.249 | 1.051 | 1.261 | 1.247 | 1.077 |

According to the aforementioned examples, performance of a small-sized camera may improve.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system, comprising:
a first lens, a second lens having negative refractive power, a third lens having negative refractive power, a fourth lens having positive refractive power, a fifth lens having positive refractive power and a convex object-side surface in a paraxial region, a sixth lens, a seventh lens, and an eighth lens having a concave object-side surface in a paraxial region, disposed in order from an object side in a direction of an imaging plane,
wherein TTL/2IMGHT<1.5, where TTL is a distance from an object-side surface of the first lens to the imaging plane and IMGHT is one-half of a diagonal length of the imaging plane,
wherein −2.0<(R13+R14)/(R13−R14)<−0.8, where R13 is a radius of curvature of an object-side surface of the seventh lens and R14 is a radius of curvature of an image-side surface of the seventh lens.

2. The imaging lens system of claim 1, wherein the second lens has a concave image-side surface.

3. The imaging lens system of claim 1, wherein the fourth lens has positive refractive power.

4. The imaging lens system of claim 1, wherein the fifth lens has a concave image-side surface.

5. The imaging lens system of claim 1, wherein the sixth lens has negative refractive power.

6. The imaging lens system of claim 1, wherein the seventh lens has positive refractive power.

7. The imaging lens system of claim 1, wherein $0.5<f1/f<1.0$, where f is a focal length of the imaging lens system, and f1 is a focal length of the first lens.

8. The imaging lens system of claim 1, wherein the second lens has an Abbe number of lower than 40.

9. The imaging lens system of claim 1, wherein $0.05<TTL/FOV<0.2$, where FOV is a field of view of the imaging lens system.

10. The imaging lens system of claim 1, wherein $0.2<T8/T7<0.9$ [MM/°], where T7 is a thickness of the seventh lens at a center of an optical axis, and T8 is a thickness of the eighth lens at a center of an optical axis.

11. The imaging lens system of claim 1, wherein an f number of the imaging lens system is 1.7 or lower.

12. The imaging lens system of claim 1, wherein $-4.0<f2/f1<-2.0$, where f1 is a focal length of the first lens, and f2 is a focal length of the second lens.

13. The imaging lens system of claim 1, wherein $0.2<f3/f2<0.5$, where f2 is a focal length of the second lens, and f3 is a focal length of the third lens.

14. The imaging lens system of claim 1, wherein $-5.0<f6/f7<-2.0$, where f6 is a focal length of the sixth lens, and f7 is a focal length of the seventh lens.

15. The imaging lens system of claim 1, wherein where f7 is a focal length of the seventh lens, and f8 is a focal length of the eighth lens.

16. An imaging lens system, comprising:
a first lens having positive refractive power, a second lens having negative refractive power, a third lens having negative refractive power, a fourth lens having positive refractive power, a fifth lens having positive refractive power and a convex object-side surface in a paraxial region, a sixth lens having negative refractive power, a seventh lens having positive refractive power, and an eighth lens having negative refractive power, disposed in order from an object side in a direction of an imaging plane,
wherein TTL/2IMGHT<1.5, where TTL is a distance from an object-side surface of the first lens to the imaging plane and IMGHT is one-half of a diagonal length of the imaging plane,
wherein −2.0<(R13+R14)/(R13−R14)<−0.8, where R13 is a radius of curvature of an object-side surface of the seventh lens and R14 is a radius of curvature of an image-side surface of the seventh lens.

17. The imaging lens system of claim 16, wherein the first through seventh lenses are meniscus lenses and the eighth lens is a bi-concave lens.

18. The imaging lens system of claim 16, wherein the first lens is thicker along the optical axis than each of the other lenses.

19. An imaging lens system, comprising:
a first lens, a second lens having negative refractive power, a third lens having negative refractive power, a fourth lens having positive refractive power, a fifth lens having positive refractive power and a concave image-side surface in a paraxial region, a sixth lens, a seventh lens, and an eighth lens having a concave object-side surface in a paraxial region, disposed in order from an object side in a direction of an imaging plane,
wherein TTL/2IMGHT<1.5, where TTL is a distance from an object-side surface of the first lens to the imaging plane and IMGHT is one-half of a diagonal length of the imaging plane,
wherein −2.0<(R13+R14)/(R13−R14)<−0.8, where R13 is a radius of curvature of an object-side surface of the seventh lens and R14 is a radius of curvature of an image-side surface of the seventh lens.

* * * * *